United States Patent
O'Connor et al.

[19]

[11] Patent Number: 5,838,306
[45] Date of Patent: Nov. 17, 1998

[54] MOUSE WITH SECURITY FEATURE

[75] Inventors: Clint O'Connor; Erica Scholder, both of Austin, Tex.

[73] Assignee: Dell U.S.A., L.P., Round Rock, Tex.

[21] Appl. No.: 914,948

[22] Filed: Aug. 20, 1997

Related U.S. Application Data

[63] Continuation of Ser. No. 435,318, May 5, 1995, abandoned.

[51] Int. Cl.$^6$ ........................................... G09G 5/08
[52] U.S. Cl. ........................... 345/163; 345/156; 382/124
[58] Field of Search ................................. 345/156, 157,
345/161, 163, 167, 173; 340/825.3, 825.31,
825.32, 825.34; 382/115, 124

[56] References Cited

U.S. PATENT DOCUMENTS

| | | | |
|---|---|---|---|
| 4,754,268 | 6/1988 | Mori | 345/163 |
| 4,924,085 | 5/1990 | Kato et al. | 250/227.28 |
| 5,210,588 | 5/1993 | Lee | 382/124 |
| 5,229,764 | 7/1993 | Matchett et al. | 382/115 |
| 5,363,446 | 11/1994 | Ruppertz et al. | 380/4 |
| 5,420,936 | 5/1995 | Fitzpatrick et al. | 345/173 |
| 5,485,622 | 1/1996 | Yamaki | 395/186 |

FOREIGN PATENT DOCUMENTS

| | | | |
|---|---|---|---|
| 4-111038 | 4/1992 | Japan | 382/124 |

*Primary Examiner*—Xiao Wu
*Attorney, Agent, or Firm*—Haynes and Boone, L.L.P.

[57] ABSTRACT

A mouse computer input peripheral device includes a window area integrally constructed within the mouse and positioned at an area on the mouse upon which a user normally places a finger in operating the mouse. The mouse further includes an illuminating device and a light sensitive detection device for providing a user signature signal representative of the characteristics of the ridge and valley pattern of the fingerprint of a finger placed upon the window area. The signature signal is transmitted to the BIOS within the computer system in which the mouse is operating and compared with one or more stored patterns which have previously been authorized for access to the computer system. When the user's signature signal is compared with and matches one of the stored and approved signature signals, the system is enabled and the user is granted access.

8 Claims, 8 Drawing Sheets

MOUSE WITH SECURITY FEATURE

This is a continuation of copending application Ser. No. 08/435,318 filed on May 5, 1995, now abandoned.

FIELD OF THE INVENTION

The present invention relates generally to security systems, and more particularly to a security device and method for use with a computer system.

BACKGROUND OF THE INVENTION

Security problems have long been a concern with personal computers, not only for files stored on local hard drives, but also for access to networks through which personal computers or PCs are attached. Unauthorized access can lead to lost or modified files, compromised personal and corporate information, and introduction of viruses to PCs and networks.

Password protection is the first, and normally only defense against unauthorized intruders. Passwords are often defeated by the users themselves by the choice of easily guessed password names, by writing down the password and placing it in an easily accessible location, or by using a common word which can be found with a search program using a dictionary database.

More elaborate schemes are often not adopted because they require extensive and expensive additional security that may equal or exceed the cost of the cost of the personal computer. Less intrusive schemes, such as handwriting recognition, usually require nonstandard accessories which otherwise cost more and often serve no other purpose. Thus, there is a need for an apparatus and method to achieve high security protection of access to personal computers in an unobtrusive fashion which will not require additional desktop space or re-programming of standard applications for conventional use.

SUMMARY OF THE INVENTION

It is therefore an object of the present invention to provide a device for inputting information to a computer system by a user, wherein the computer system includes a main housing for housing computer processing circuitry. The device comprises a peripheral housing separate from the main housing, with the peripheral housing being arranged to contain at least one switching device for inputting information to the computer system. The device is further characterized by including fingerprint acquisition means selectively operable for providing a user fingerprint signal representative of the fingerprint of a user, and circuitry for transmitting the user fingerprint signal to the main housing of the computer system for processing by the computer processing circuitry.

In a more specific embodiment, there is provided memory circuitry and comparison circuitry within the computer processing circuitry, where the comparison circuitry is operable to compare the user fingerprint signal with authorized fingerprint signals in the memory circuit and providing an access enable signal when a user fingerprint signal meets predetermined criteria with one of the authorized fingerprint signals.

In another embodiment, the invention comprises a peripheral device for use within a computer system, the peripheral device being operable by a user for interfacing with the computer system. The peripheral device includes a peripheral housing means for housing electronic circuitry; fingerprint acquisition means selectively operable to provide a user fingerprint signal representative of the fingerprint of the user; memory means for storing at least one authorized fingerprint signal representative of an authorized user's fingerprint; and comparison circuitry coupled to the fingerprint acquisition means and said memory means, said comparison means being operable to effect a comparison of the user fingerprint signal with the authorized fingerprint signals and providing a comparison output signal representative of said comparison.

Another implementation of the present invention includes a method for obtaining security clearance prior to enabling a user to have access to a computer system, wherein the computer system has a main housing for housing memory circuitry and processing circuitry therein, and also a mouse peripheral device separate from said main housing for providing user input to the computer system. The method comprising the steps of sensing an impression of a user's fingerprint upon said mouse peripheral device; producing a user fingerprint signal representative of the sensed fingerprint; transmitting the user fingerprint signal to the main housing; comparing said user fingerprint signal with authorized user fingerprint signals stored in said memory circuitry; and providing a security clearance signal representative of the results of the comparison.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

Figure 1:
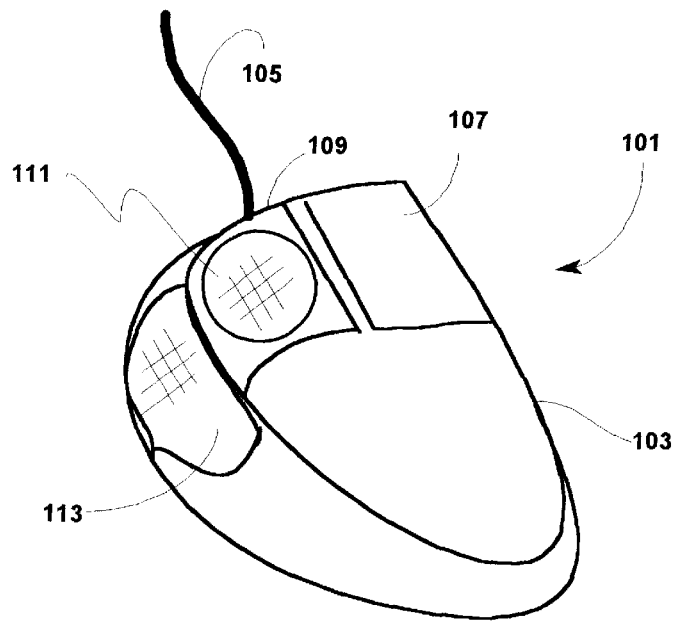
FIG. 1 is an illustration of a mouse peripheral device utilizing one embodiment of the present invention.

The exemplary embodiment shown in the drawings includes a peripheral mouse device, with a window, an integral Charge-Coupled Imaging Device (CCD), and a light source coupled with a data encoder, decoder and other exemplary processing circuitry. Charge-Coupled Imaging Devices are well known in the art and generally include an MOS capacitor with an electrode attached on top of silicon dioxide on a semiconductor substrate surface. When voltage is supplied between the electrode and the substrate, a depletion layer is formed at the silicon dioxide and the semiconductor interface, resulting in a potential well of low energy ranking for the minority carrier. If the signal charge generated by light radiation is injected into this potential well, the signals are temporarily stored and memorized as analog quantities.

Figure 3:
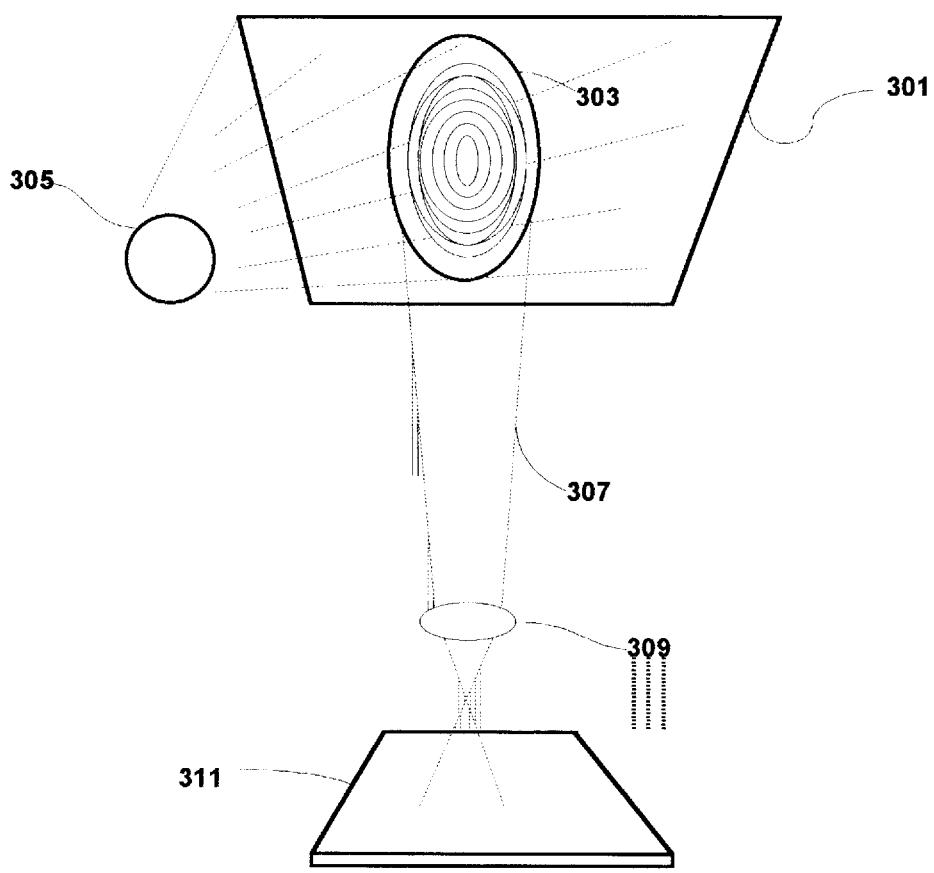
FIG. 3 is a perspective schematic diagram illustrating an exemplary optical implementation that may be utilized in connection with the present invention.

In the illustrated embodiment of the present invention, the CCD elements are arranged in a matrix comprising a light sensitive CCD device 311 upon which an image of a fingerprint is projected as shown in FIG. 3. Each individual CCD element may correspond to an individual pixel of a fingerprint signature signal which will be analyzed and processed as hereinafter explained. The CCD array 311 operates as an analog shift register to obtain and transfer out pixels of information defining the fingerprint signature projected thereon. It is noted that many other sensing arrangements may be substituted for the CCD device shown herein to provide a fingerprint "signature" for comparison with approved fingerprints signatures, to generate a "Pass/Fail" output in accordance with the present invention, without departing from the spirit and teachings of the present invention.

The mouse and circuitry implemented herein is designed to allow normal operation of the peripheral mouse device for information input and control operations in connection with a computer, and, at the same time, provide a security function without the need for additional hardware or other devices not normally used with a computer or workstation system assembly. The invention is designed to be used as a replacement for a typical PC mouse and will function as a standard mouse in all respects under normal use. Moreover, it is also anticipated that, in addition to its use in new systems, the device of the present invention may also be designed to include the associated electronics within the mouse itself to enable users to directly swap out the present invention with the mouse they are currently using, and receive the added functionality and features of the present invention. The security feature may also be encoded into the Basic Input Output System (BIOS) so that the security function cannot be defeated by loading from a floppy disk when the computer is initiated or "booted".

Referring now to FIG. 1 in detail, there is shown a mouse peripheral input device 101, which includes a body portion 103. The mouse 101 may be one of any of those in general widespread use since all of such devices are capable of including the features disclosed herein in accordance with the present invention. The mouse 101 includes the actuation switches 107 and 109 shown on top of the mouse 101, which are or may be modified as hereinafter disclosed. As shown in the present example, the actuation switch 109 also includes a transparent or frosted section or window area 111 which is arranged to receive a finger, normally a pointer finger, to input manipulation and control selections from a user.

Also shown in FIG. 1 is another window area 113 on the side of the mouse 101. The second area 113 is located such that a user will naturally place a thumb on the area 113 when operating the mouse 101. Additional window areas may be designed into the other side of the mouse device 101 for additional fingerprint checks or to accommodate left-handed users. A control cable 105 provides an electrical interface to the computer system to which the mouse 101 is connected. As hereinafter explained, the connected computer system will have all of the standard circuitry and features including the Basic Input Output System which is operational to provide fundamental and primary support and control for the entire system.

In the present example, the switch areas 111 and 113 are implemented with Charge-Coupled Imaging Devices (CCDs), and the actuation switch 109 is fully operable to provide its normal switching and "hold-and-drag", and other functions as well as being operable to receive fingerprint impressions on the area 111 for further processing as hereinafter explained. It should also be noted that the area 113 on the side of the mouse 101 may be either a dedicated area for receiving fingerprint impressions or area 113 may also be a switch similar to switch 109 to combine a switching function with the security function. The switching function served by such a switch may be totally unrelated to the security feature or it may be an integral part of the security feature and have as at least one of its purposes, the initiation and/or termination of the security function itself.

Figure 2:
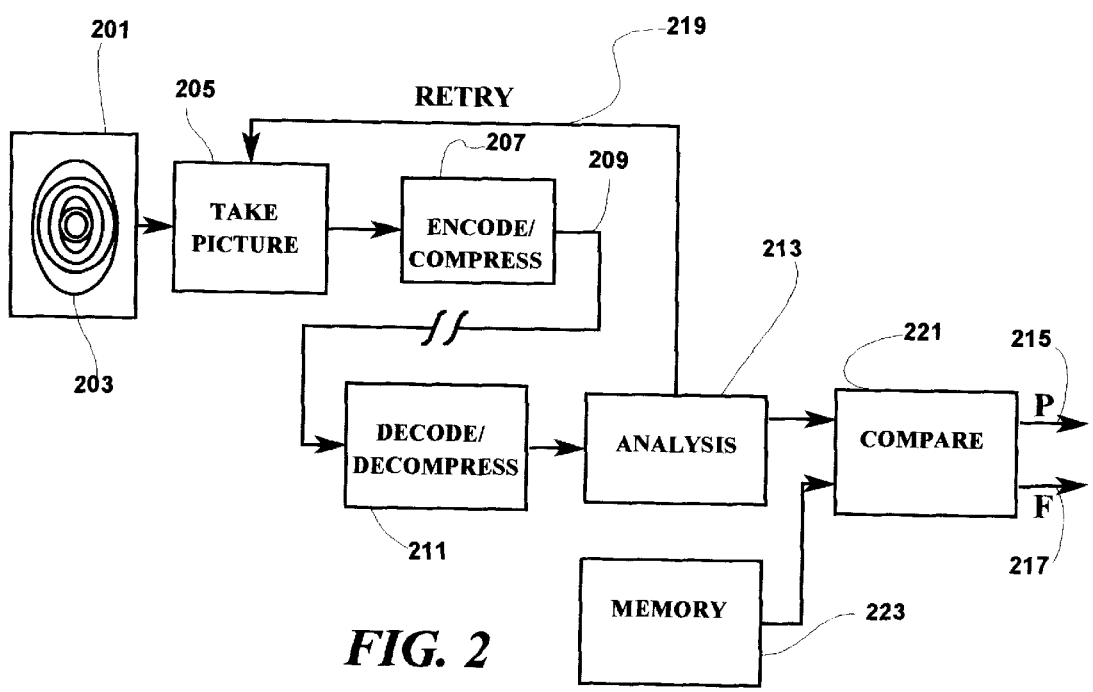
FIG. 2 is a block diagram of a signal processing scheme which may be implemented in practicing the present invention.
Figure 4:
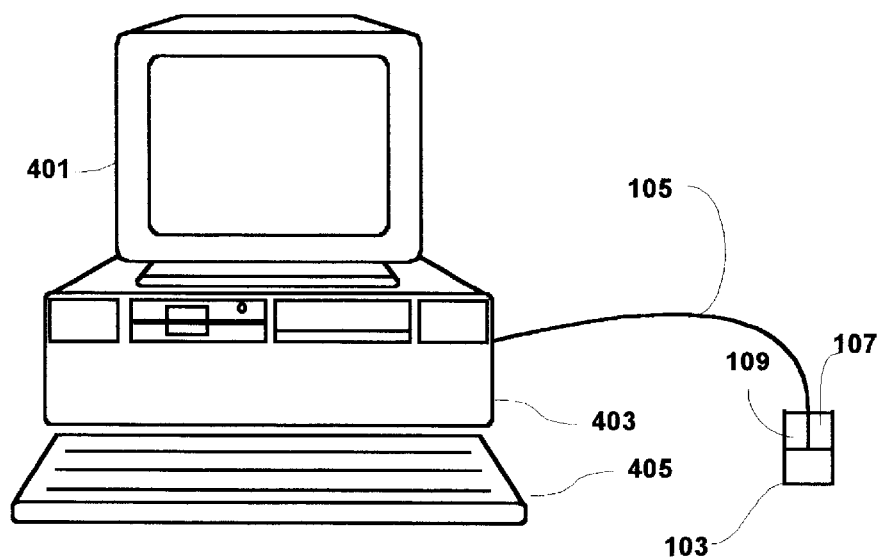
FIG. 4 is an illustration of a typical computer system in which the present invention may be implemented.

In FIG. 2, a fingerprint image 203, representative of a fingerprint as may be applied to the areas 111 or 113, is shown impressed upon an area 201. Area 201 corresponds to either of the plates 111 and 113 of FIG. 1. The first step in the process illustrated in FIG. 2 includes taking a picture 205 of the fingerprint image 203. That function may be performed through various state-of-the-art devices including the CCD device previously discussed. After taking a picture 205 of the fingerprint 203, the information thereby obtained is translated into an electrical signal representative thereof. The fingerprint signal may be encoded and/or compressed if desired, by circuitry 207 and applied to additional or other circuitry, or system circuitry including BIOS, for further processing 209. As illustrated by the signal path 209, the fingerprint signature signal being processed for system authorization may be transmitted from the mouse peripheral unit 101 to a main housing 403 as shown in FIG. 4. If more of the processing circuitry is included in the mouse peripheral unit 101, the encode/compress 207 and decode/decompress 211 functions may not be required for system implementation. After the fingerprint signals have been processed 209 by the system as may be required by the designer of the particular security system, those signals may be applied to decode and/or decompress circuitry 211. The signals from the Decode/Decompress circuitry 211 are applied to an analysis circuit 213 which provides a processed fingerprint signature signal to a compare circuit 221.

A memory device 223, which contains electronic signals representative of various "approved" fingerprint signals, is arranged to provide authorized fingerprint signals to the compare circuit 221. The compare circuit 221 provides one of two output signals "P" and "F", on output lines 215 and 217, respectively, representative of whether or not the signals representative of the sample fingerprint "pass" or "fail" a comparison with one or more stored and authorized fingerprint sample signals provided by the memory device 223. If the initial analysis 213 of the acquired fingerprint signature signal fails, the security function may include several "RETRY" operations or cycles 219. Also, although not shown, the Retry cycle 219 may also be called one or more times if the compare function 221 does not yield a Pass signal "P".

It will be recognized that the signal processing scheme shown in FIG. 2 and described in detail above may be implemented by and within the mouse peripheral input device 101 (FIG. 1), the computer system (FIG. 4), or some combination of the two.

In FIG. 3, an impression area 301 includes an impression 303 of a finger. The area 301 is illuminated by a light source 305 and light rays 307 from the image of the impression 303 are collected by a focusing lens 309 and projected to a light sensitive CCD array 311. The Light sensitive CCD array 311 is implemented to transform the fingerprint image into corresponding electrical signals for processing as hereinbefore noted.

In FIG. 4, a typical computer system includes a display device 401 which is coupled to a CPU unit or main housing 403. A keyboard 405 is also coupled to the main housing 403 to provide one means of inputting information to the computer system. A mouse input device 103 is also shown connected to the main housing 403. The input provided by the mouse peripheral device 103 is shown connected to the main housing 403 by the cable 105 although input may also be transmitted to the main housing through an infrared system and still obtain the advantages of the present invention. The peripheral mouse 103 includes switches 107 and 109 as well as the fingerprint sensitive pads or plates as previously disclosed in connection with the FIG. 1 embodiment.

Figure 5:
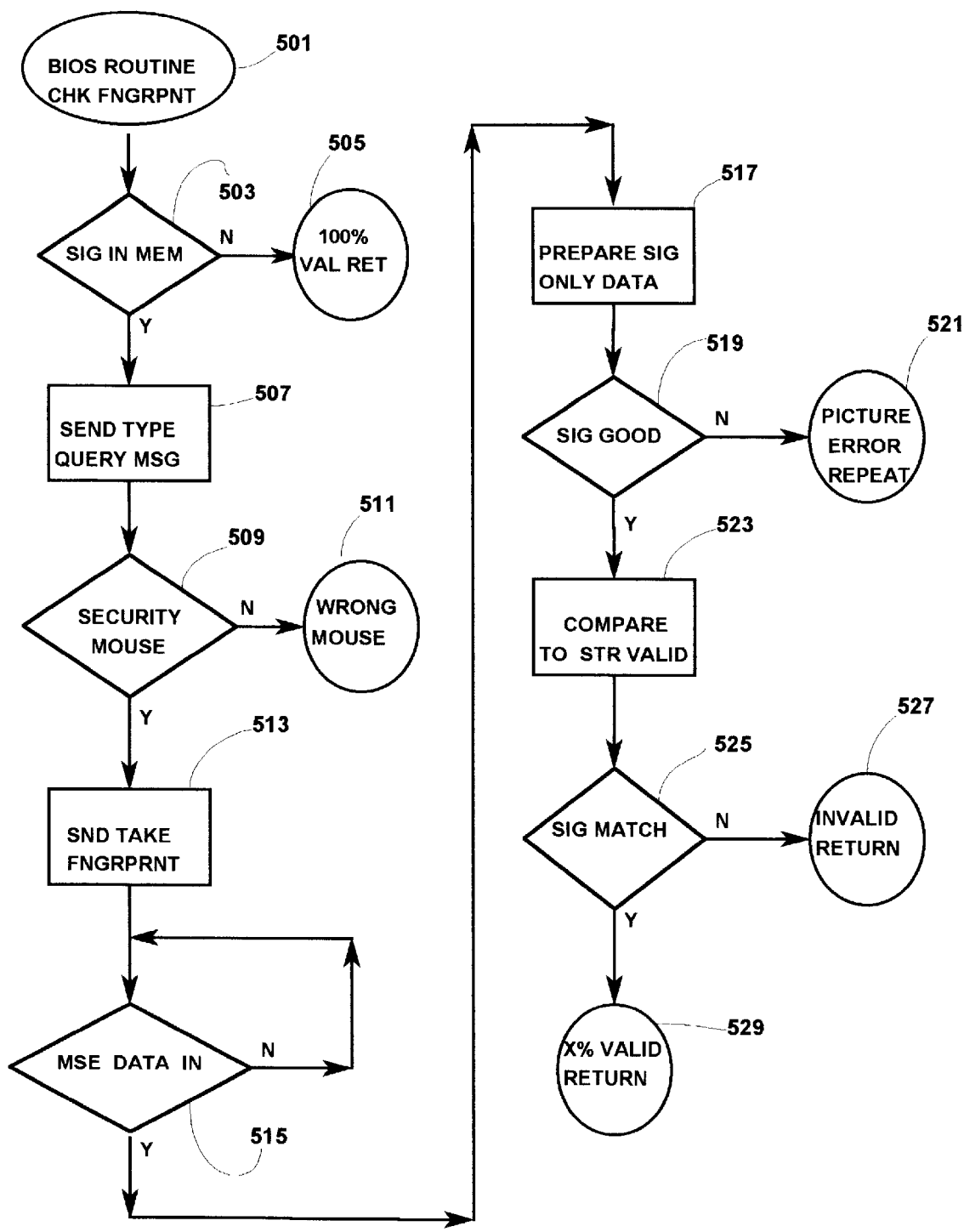
FIG. 5 is a flow chart showing one embodiment of the present invention as implemented in a Basic Input Output System (BIOS) routine.

FIG. 5 illustrates the method of the present invention as implemented in a program running on the computer system shown in FIG. 4. The check fingerprint BIOS routine 501 determines if a designated memory contains any pre-approved signatures 503 and if not, then a "100% Valid" return is generated 505. If there are signatures in the memory, then a query message is sent to determine the mouse type 507. If the mouse type being used is not one compatible with the security system being implemented 509, the "wrong mouse" message 511 is sent from the system. If the mouse type is determined to be a security compatible mouse, then the "take fingerprint picture" message 513 is issued. The system then awaits the Mouse data 515 and cycles until the mouse data is received. When the mouse data is received, the system is operable to strip off the standard data, and preprocess fingerprint data into a comparison-ready signature 517. If the fingerprint data is not tested "good" 519, a picture error message is sent 521. If the fingerprint data is sufficient, it is compared 523 to one or more valid signatures stored in memory. If there is not a signature match, an invalid return signal is sent 527. If there is a signature match, then an X% valid return signal is sent, depending upon the design of the particular system.

Figure 6:
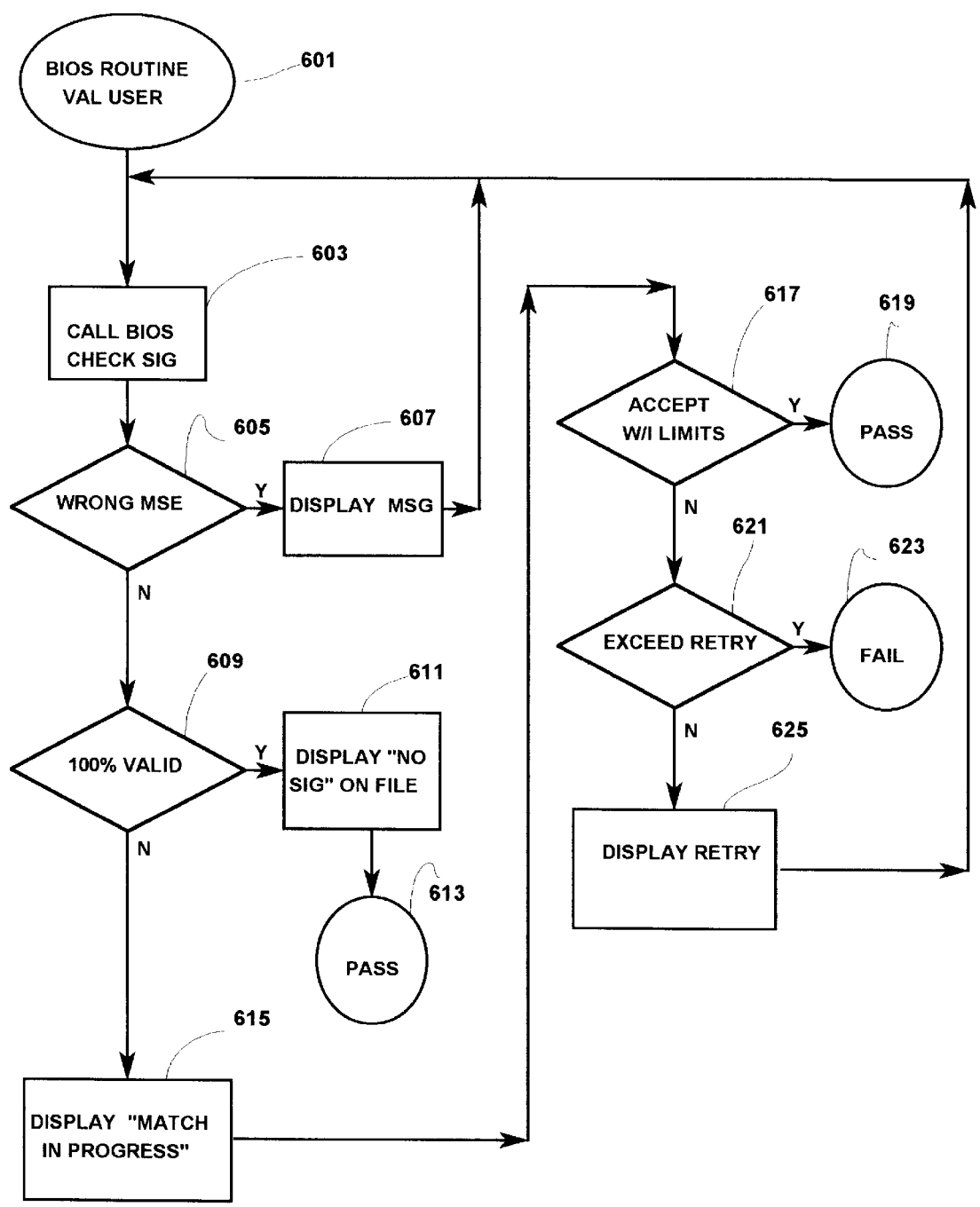
FIG. 6 is another flow diagram illustrating a validate user entry routine.

In FIG. 6, a BIOS routine is shown to validate a user entry 601 to the system. Upon initiation, the BIOS is called and the check signature process 603 is run. If there is a wrong mouse return 605, the "Wrong Mouse" message is displayed 607 and the system loops back to the BIOS call 603. If the mouse is correct, a check is made to see if the system designer has designed in a 100% valid feature 609 and if so, a "no signatures on file" message may be displayed 611 and a "pass" message sent to allow entry to the system. If, however, a signature matching function is designed into the system, i.e. there is no "100% valid" access, then the input signature is matched against stored approved signatures on file and a "matching in progress" message 615 may be displayed to the user. If the signature signal compares within predetermined limits with stored characteristics of pre-approved signatures 617, then a "pass" message is sent 613 to allow entry into the system. If the input signature is not within limits, and a predetermined retry count has been exceeded 621, then a fail message 623 is sent and access to the system is denied. If, however, the signature is not within acceptable limits but the retry allowance has not been exceeded, then the "retry" message is displayed 625 and the user may be allowed again to access the system.

Figures 7, 8:
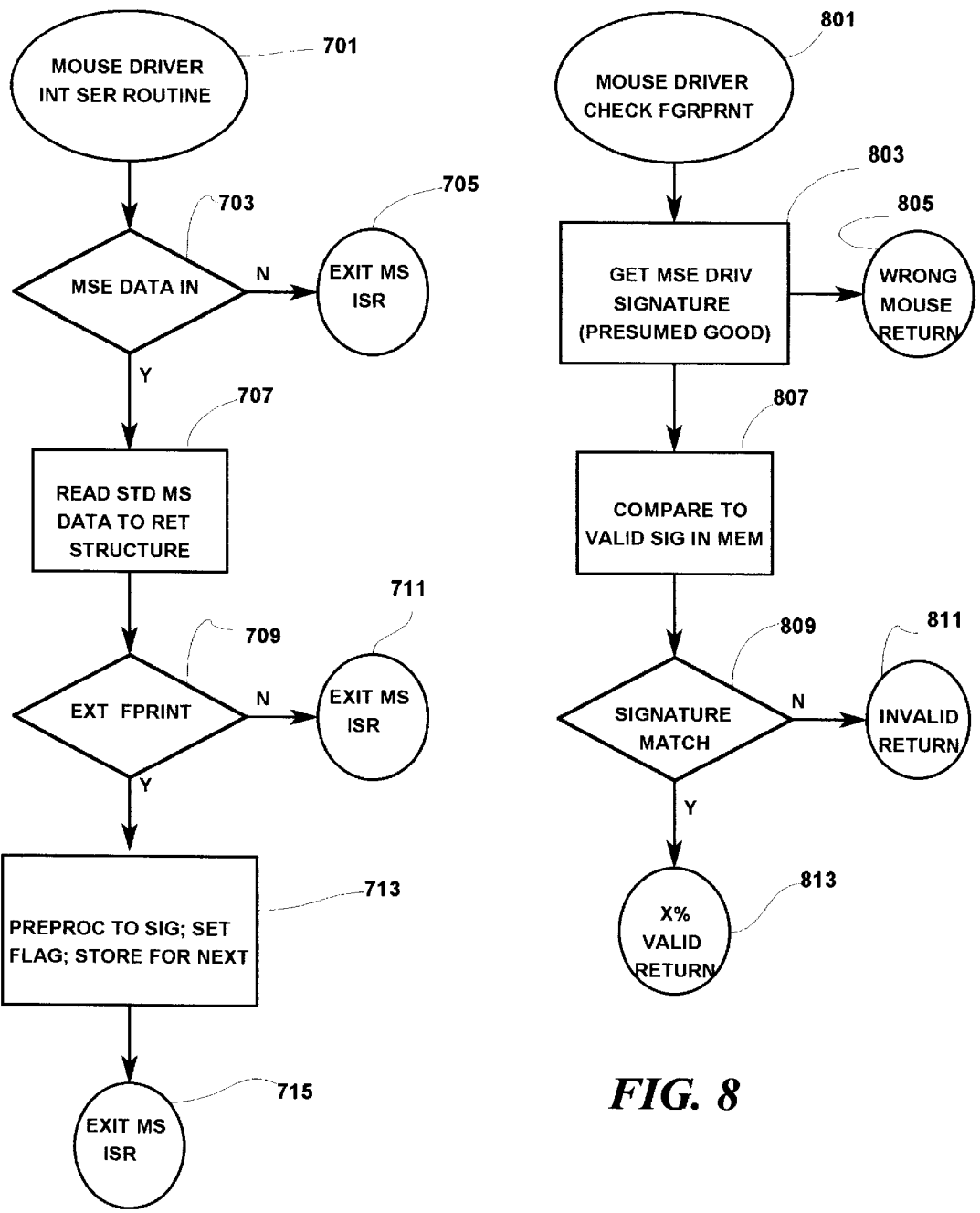
FIG. 7 is a flow chart showing an interrupt service routine.
FIG. 8 is a method flow illustrating a mouse driver routine.

A Mouse Driver or Interrupt Service Routine 701 is illustrated in FIG. 7. When the mouse data is not presented 703, the system will exit 705 the Mouse Interrupt Service Routine (ISR). If, however, the mouse data is presented, then the system will read the standard mouse data into the return structure 707. If there is no extended fingerprint data present 709, then the system will exit the Mouse ISR. However, if there is extended mouse data present, then the system will pre-process the fingerprint data into a signature signal, set an appropriate flag, store the data for the next use 713, and exit the Mouse ISR 715. FIG. 8 shows the Check Fingerprint Mouse Driver routine 801. The mouse driver signature is obtained 803 and a Wrong Mouse Return 805 may be issued if appropriate. The signature is compared 807 to one or more approved signatures in memory and if there is a signature match 809, an X% return is issued depending on system design. The X% return, for example could include 100% return if no signatures exist in memory. If there is no signature match, then an "invalid return" 811 is issued.

Figure 9:
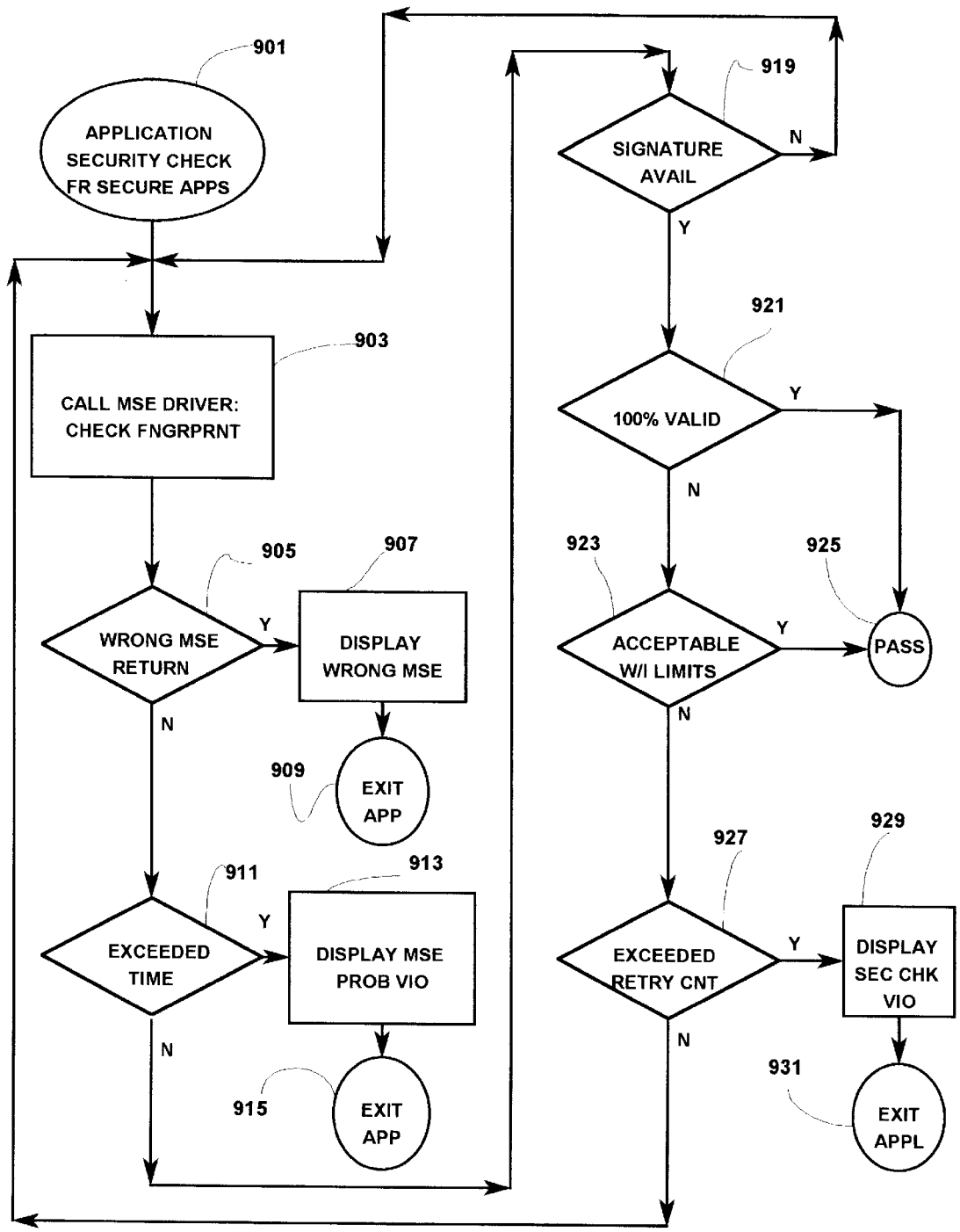
FIG. 9 is a flow chart showing an application security check routine.

In FIG. 9, an application security check routine 901 is illustrated, which may be called from various places in secure applications. Initially, the Check Fingerprint Mouse Driver is called 903. If there is a "wrong mouse" return 905 then a wrong mouse violation is displayed 907 and the application may be exited 909. If there is no "wrong mouse" return 905 but the elapsed time exceeds what is designated as "normal acquisition time" 911, then a mouse problem violation message may be displayed 913 and the application may be exited 915. If the normal acquisition time has not been exceeded and a signature is not available 919, then, the system may recycle from the "Call" 903. If, however, a signature is available 919 and the system is designed for 100% valid 921, a "Pass" message is sent. If there is not a 100% valid designation 921 but the signature matches one or more on file within acceptable limits 923, then a "Pass" message 925 is sent. If the signature is not within acceptable limits and a designated retry count has been exceeded 927, then a security check violation is displayed 929 and the system exits the application 931. If the retry count has not been exceeded 927 then the routine recycles from the beginning.

Referring again to FIG. 1, the window area 113 can be located at the side of the mouse 101 where the thumb is normally used to grasp the mouse 101 or it can be placed in one of the buttons in a manner such that the button or switch is still operational. The window area should optimally be clear with a frosted surface on the outside of the window 111. All of the light sources are contained within the mouse 101 and shine light at an oblique angle to the window areas 111 and 113. The CCD imaging device views the window and is focused on the outside surface of the window 111.

The frosted surface 111 or 113 will normally scatter the light in a diffuse, even pattern. When a finger or thumb is placed into contact with the window, the oiled ridges of the skin whorl patterns will penetrate and fill the frosted areas while the valleys within the patterns will not. Contrast control can be achieved by varying the intensity of the light source or the timing of the "Read" processing for the CCD imager.

When enabled by an enhanced mouse-aware program, the light source is triggered and a snapshot of the fingerprint is taken by the CCD imaging device. The CCD data is read out from the imaging device and is compressed 207 and transmitted 209 to the PC in the form of an extended data record appended to the normal mouse data. Alternatively, a microprocessor can be embedded in the mouse to partially process the fingerprint data and recognition processing to reduce the data traffic on the mouse cable. The BIOS programming analyzes the fingerprint data and decompresses 211 the data into an encoded "signature" which is compared 213 against authorized signature profiles which are stored in the system's memory. The security processing 213 can be rigorous or loose in adherence, returns a pass "P" or fail "F" signal to the caller and several passes or "Retry" cycles 219 may be required to positively match a fingerprint signature.

Figure 10:
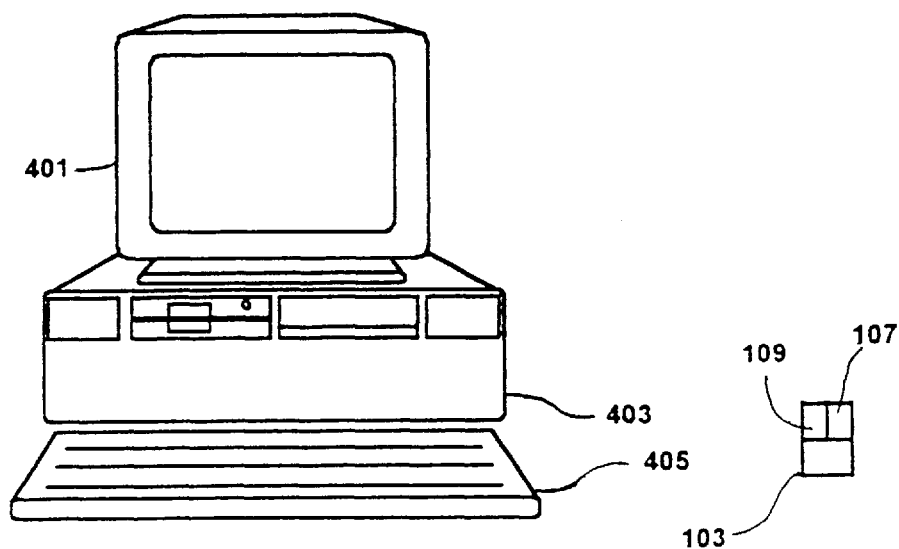
FIG. 10 is an illustration of an alternate embodiment of a computer system in which the present invention may be implemented.

The device 101 is capable of transmitting normal mouse motion and button state information in the default power-up mode. In the preferred implementation, that information will be transmitted over, for example, a serial communications cable 105 which typically contains power, ground, clock and data signals. The mouse information may also be transmitted in a wireless arrangement in which such information may be sent, for example, using infrared technology. Such a wireless arrangement is shown in the computer system of FIG. 10. Because the system of FIG. 10 is similar to that of FIG. 4, identical components are given same reference numerals. Mouse data is transmitted to the PC using a serial protocol and encoding the mouse data into the serial stream at rates ranging from 1200 bits per second (BPS) to 9600 BPS or higher. Encoded into this stream, in one of several popular or proprietary industry formats, are the button or switch states and the "X" and "Y" position counter information. Additional information from the processing of the fingerprint signature is added to that byte stream.

Normal operation would include invoking the fingerprint recognition feature in the BIOS at computer initiation or at "boot" time before the floppy disk is checked. If the mouse is not present, the boot process fails or starts over. During the boot process, a modified mouse driver is loaded which provides enhanced mouse features, among which is a call to the BIOS security feature which can be invoked at critical times, such as before any floppy disk writes after an elapsed time-out period, or upon network login, etc. Failure to pass the fingerprint check results in aborting the application or preventing further use of the PC, depending upon the BIOS or application programming. The security processing may also be set-up to run automatically at regular intervals even interrupting otherwise normal PC operation and operating programs to perform additional and continuing verification of user authorization.

The apparatus of the present invention has been described in connection with the preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention as defined by the following claims.

We claim:

1. A peripheral device for inputting information and allowing access to a computer system by a user, the computer system including a main housing for housing computer processing circuitry, the device comprising:

a peripheral housing separate from the main housing, said peripheral housing being arranged to contain at least one switching device for generating input information;

fingerprint acquisition means selectively operable for providing a user fingerprint signal representative of the fingerprint of a user;

peripheral processing circuitry disposed within said peripheral housing for processing said user fingerprint signal; and comparison circuitry disposed within said peripheral housing and coupled to said peripheral processing circuitry for comparing said processed user fingerprint signal with authorized fingerprint signals to allow access to computer system by the user when predetermined criteria are satisfied.

2. The invention as set forth in claim 1 wherein said peripheral device is movable relative to the main housing.

3. The invention as set forth in claim 1 further including memory circuitry, said memory circuitry being coupled to said comparison circuitry, wherein said comparison circuitry being operable to compare said user fingerprint signal with authorized fingerprint signals in said memory circuit and to provide an access enable signal when said user fingerprint signal meets predetermined criteria with one of said authorized fingerprint signals.

4. The invention as set forth in claim 1 wherein said switching device is selectively operable by a user to input information to the computer system, said switching device and said fingerprint acquisition means having at least one common operative part.

5. The invention as set forth in claim 4 wherein said common operative part comprises a switching plate, said switching plate being operable by a user's finger to selectively provide a switch closure signal, said switching plate being simultaneously operable to provide an impression of the fingerprint of the user as an input to said fingerprint acquisition means.

6. The invention as set forth in claim 5 wherein said peripheral device further includes a light source within said peripheral housing and arranged to illuminate said switching plate from within said peripheral housing means, said peripheral device further including a light sensitive device responsive to said illuminated switching plate for providing said user fingerprint signal.

7. A method for obtaining security clearance to enable a user to have access to one or more applications on a computer system, said computer system having a main housing and having a peripheral input device separate from said main housing for inputting information to said computer system, said peripheral input device housing memory circuitry and processing circuitry therein, said method comprising the steps of:

(a) sensing a predetermined characteristic of a user's fingerprint using said mouse peripheral device;

(b) producing a user identification signal representative of the sensed characteristic;

(c) comparing said user identification signal with authorized user identification signals stored in said memory circuitry; and (d) providing a security clearance signal representative of the results of said step of comparing to said main housing.

8. The invention as set forth in claim 7 wherein said characteristic is a fingerprint topography of the user, and said identification signal is a fingerprint signal representative of said topography.

* * * * *